United States Patent [19]

Speranza et al.

[11] Patent Number: 5,010,160

[45] Date of Patent: Apr. 23, 1991

[54] PROCESS FOR PREPARING NOVEL DIAMINES

[75] Inventors: George P. Speranza, Austin; Jiang-Jen Lin, Round Rock; Michael Cuscurida, Austin, all of Tex.

[73] Assignee: Texaco Inc., White Plains, N.Y.

[21] Appl. No.: 430,686

[22] Filed: Oct. 30, 1989

Related U.S. Application Data

[62] Division of Ser. No. 78,309, Jul. 27, 1987, Pat. No. 4,906,774.

[51] Int. Cl.$^5$ .............................................. C08G 18/80
[52] U.S. Cl. ...................................... 528/45; 528/61; 528/64
[58] Field of Search ........................ 528/45, 61, 64

[56] References Cited

FOREIGN PATENT DOCUMENTS

WOA86/057-95 10/1986 PCT Int'l Appl. .
2121812A 1/1984 United Kingdom .

Primary Examiner—Maurice J. Welsh
Attorney, Agent, or Firm—Jack H. Park; Kenneth R. Priem; Cynthia L. Kendrick

[57] ABSTRACT

Polyoxyalkylene diamine reaction products which contain as the principle reaction component, a diamine having the formula:

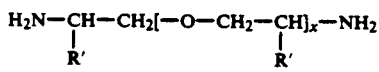

wherein R' independently represents hydrogen or methyl and x is a number having an average value of at least 1 to about 60 and a diisocyanate of the formula:

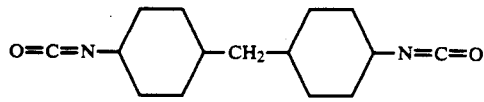

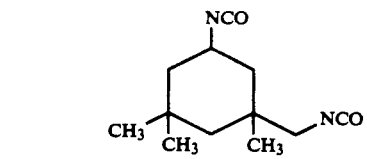

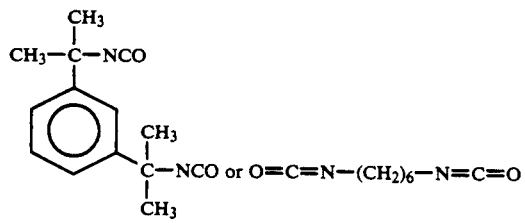

The products of the invention are obtained by reacting an excess of polyoxyalkylene diamine with a diisocyanate in the presence of a polar solvent and have the following general structures:

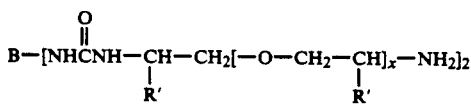

where B is alkyl group from diisocyanates, and R' has the same meaning as above.

These products are further used to prepare coatings with improved properties by reacting said amine products with isocyanates prepolymers and epoxy material.

2 Claims, No Drawings

PROCESS FOR PREPARING NOVEL DIAMINES

This is a division of application Ser. No. 07/078,309 filed Jul. 27, 1987 now U.S. Pat. No. 4,906,774.

FIELD OF THE INVENTION

This invention relates to diamines. More particularly, this invention relates to novel diamine products synthesized from polyoxyalkylenediamines and isocyanates. Still more particularly, this invention relates to novel diamine products prepared by reacting at least about two mole equivalents of a polyoxyalkylenediamine with alkyl diisocyanates in the presence of alcohol solvents. The reaction is preferably conducted at ambient temperature and a nitrogen atmosphere.

The novel diamines of the present invention are liquids or amorphous solids depending upon the starting materials and can be useful as epoxy curatives. Furthermore, the capped diamines with at least two urea functionalities have use in coating applications.

BACKGROUND OF THE INVENTION

The reaction of isocyanates with amines is known in the art and is an extremely fast reaction. It has only been recently that higher molecular weight diamines could be made to react with diisocyanates in a controlled fashion. Work in this area led to the Reaction Injection Molding (RIM) process for the preparation of polyurea plastics.

In U. S. Pat. No. 4,490,520, Orgasa et al. disclose a process for the preparation of a polyamide with improved properties which comprises polymerizing an ω-lactam in contact with (1) an alkalai catalyst and (2) a product obtained by the reaction between (a) a polyisocyanate (b) a polyoxyalkylene amine.

Kwong U.S. Pat. No. 3,257,342 is directed to epoxy resins that are cured with a amidoamine prepared by reacting about two molar equivalents of a polyoxyalkylene-diamine with an aliphatic dicarboxylic acid at high temperature. These products are amide-linked diamines in contrast to urea-linked diamines in this instant invention. The application of amidoamine in epoxy/polyamide coatings is described by V. Brytus in the Journal of Coatings Technology, Vol. 58, No. 740, Sept. 1986 pp: 45-49.

In contrast to polyamide and polyurethane reactions, the formation of urea-linkages from isocyanates and amines is an extremely fast reaction. In general, prepolymer isocyanates or "blocked isocyanates" are used when polyureas are prepared. Recent applications of this chemistry are reviewed in an article titled "Blocked Isocyanates in Coatings" by Mobay Chemical Corp., presented at "Water-Borne and Higher Solids Conference", Feb. 5-7, 1986, New Orleans, La. There are areas of commercial interest where specific products based on blocked polyisocyanates exhibit possible uses, see "Journal of Coatings Technology," Vol. 58, No. 738, Jul. 1986, pp: 49-54.

The preparations and uses of prepolymers-derived from the polyol and diisocyanate reaction are exemplified in U.S. Pats. No. 4,617,349, 4,614,787, 4,611,043 4,490,254 and 4,605,504. In a related U.S. Pat. No. 4,609,718, an adduct of a polyoxyalkylene diamine having molecular weight of 2000 and diiocyanate at 1:2 molar ratio was used as a precursor for coating applications.

It would be a distinct advance in the art if a novel polyoxyalkylenediamine containing urea groups could be prepared wherein the hardness of such cured coatings was controllable. Such a technique needs to avoid gel formation. In addition it would be a desirable property of the diamine if it were colorless, and the process of preparing these amines could be carried out at low temperature and without a catalyst. Uses of compositions with such desirable properties would be broad, especially in coating applications described in this application.

SUMMARY OF THE INVENTION

It is an object of the present invention to provide a method of preparing a polyoxyalkylene diamine molecule having a novel structure with a urea-linked polyoxyalkylenediamine without gel formation.

More specifically, in accordance with the present invention, there is provided a process for the preparation of diamines which comprises reacting a polyoxyalkylenediamine and an diisocyanate in the presence of an alcohol solvent at room temperature and atmospheric pressure. In one embodiment of this invention certain alcohol solvents are used which retard the rate of reaction of the diamines and diisocyanates and form urea-linked polyoxyalkylenediamines. The reactions are carried out preferably in a hindered alcohol solvent, particularly t-butanol or isopropanol. The novel diamines of the present invention are used as epoxy curing agents and in the preparation of polyurea coatings.

DESCRIPTION OF THE PREFERRED EMBODIMENTS

According to the present invention a polyoxyalkylenediamine having urea groups can be obtained by means of a controllable reaction and without undesirable gel formation. The novel amines, i.e. urea-linked polyoxyalkylene diamines are prepared using t-butanol or isopropanol solvents. The use of the alcohol solvent retarded the reaction rate of the diamines and diisocyanates and formed urea-linked diamines. The reaction occurred at room temperature and, the products are colorless. It is known that the reaction of isocyanates with amines is extremely fast. Only recently could higher molecular weight diamines be made to react with diisocyanates in a controlled fashion. The use of the alcohol solvent retards the reaction rate resulting in ungelled product. However, since alcohol will react with a diisocyanate, a hindered alcohol such as t-butanol or i-propanol is preferred. The higher reactive alcohol solvent such as methanol might cause the formation of urethane side products which are undesired.

The novel diamines of the present invention are diamines which contain as the principle reaction components a diisocyanate of the formula:

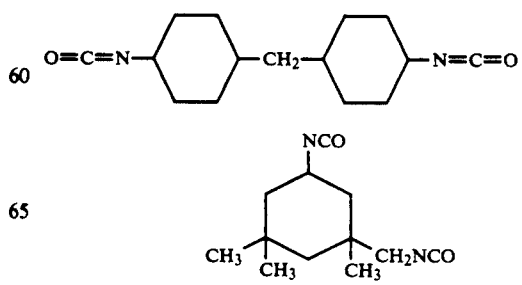

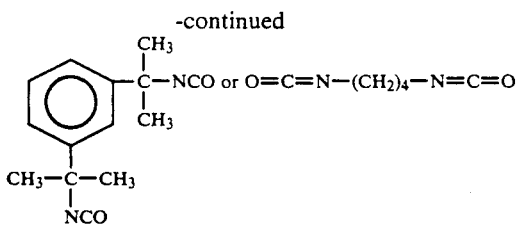

and an appropriate diamine from the group of polyoxyalkylene diamines having the formula:

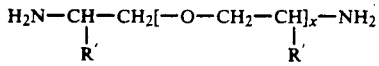

Wherein R' independently represents hydrogen or methyl and x is a number having an average value of about 1 to 60.

The novel polyoxyalkyleneamines of this invention were prepared by the reaction of polyoxyalkyleneamines and diisocyanates in the presence of alcohol solvents according to the following:

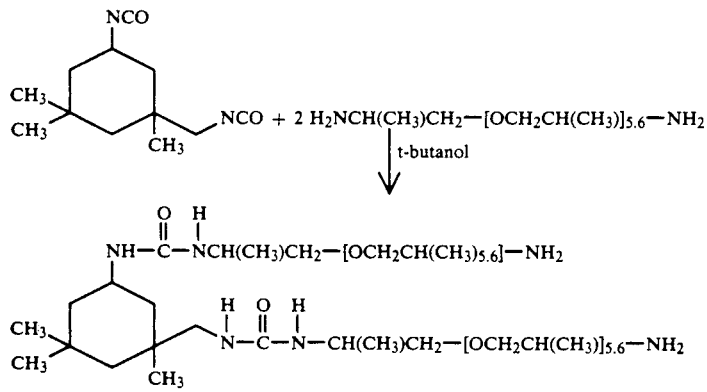

The Isocyanate

The isocyanate component for the present invention may be any suitable isocyanate having the desired functionality. Diisocyanates work well in the process. The organic diisocyanate is preferably an aliphatic isocyanate. Although diisocyanates are preferred, other higher polyisocyanates can be used in combination with diisocyanates and/or monoisocyanates. Examples of suitable aliphatic diisocyanates are aliphatic diisocyanates such as 1,4-tetramethylene diisocyanate, trimethylhexane diisocyanate and 1,6-hexamethylene diisocyanate, 1,4-cyclohexyl diisocyanate, isophorone diisocyanate, xylylene diisocyanate, m- and p- tetramethylxylylene diisocyanate, 4,4'methylene-bis(cyclohexyl isocyanate), 2,2,4-trimethylhexamethylene diisocyanate, 2,4,4-trimethylhexamethylene diisocyanate and mixtures thereof. Substituted organic polyisocyanates can also be used in which the substituents are nitro, chloro, alkoxy and other groups which are not reactive with hydroxy groups or active hydrogens and provided the substituents do not adversely affect the intended use of the diamine.

Preferred diisocyanates for producing novel polyoxyalkyleneamines, are isophorone diisocyanate, 1,6-hexamethylene diisocyanate, 4,4-methylene bis-(cyclohexylisocyanate), and tetramethylxylene diisocyanate. Isophorone diisocyanate was used in many of the examples.

The Diamine Reactant

In general the diamine starting material may be defined as a polyoxyalkylene diamine. One group of appropriate polyoxyalkylene diamines that may be used are those sold by Texaco Chemical Co. as JEFFAMINE® D-series products having the formula:

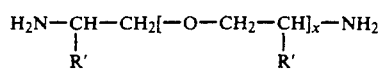

Wherein R' independently represents hydrogen or methyl and x is a number having an average value of about 1 to about 60.

Representative products having this structural formula include polyoxypropylene diamines with the structure above where x has the following values: where x = 2 to 3 for JEFFAMINE® D-230
x = 5 to 6 for JEFFAMINE® D-400
x = ~33 for JEFFAMINE® D-2000 and
x = ~60 for JEFFAMINE® D-400

The aforementioned JEFFAMINE® D-series amines appear to be very well-suited to the embodiment for producing novel diamines.

Solvents

In the method of this invention the alcohol solvent is essential for controlling this reaction and, at the same time, avoiding gel formation.

Suitable solvents are those which are less reactive toward isocyanate groups than amino compounds. Generally suitable solvents are polar or those having a high dielectric constant.

Examples of suitable polar solvents include ethanol, isopropanol, t-butanol and t-amyl alcohol. Among the solvents studied were methanol, ethanol, i-PrOH and t-BuOH. Good results were obtained using isopropanol or tert-butanol or secondary butanol.

Preparation of the Novel diamines

It has been discovered in accordance with the present invention that a novel diamine product is preferentially formed when a diisocyanate is reacted with an excess of polyoxyalkylene diamine under nitrogen atmosphere and at a temperature within the range of about 0° C. to 100° C. for a reaction time within the range of about 1 to about 10 hours. Normally, the reaction will go to completion after a reaction time within the range of about 1 to about 4 hours depending on how fast the heat of reaction can be removed.

The reaction is complete when essentially all the isocyanates have reacted with primary amine groups of the polyoxyalkylene diamine.

The novel diamines that are formed by the process of the present invention are liquids or amorphous solid materials having a molecular weight within the range of about 600 to about 10,000 and containing two terminal primary amine groups and an average of two urea functional groups.

The reaction mixture will comprise a diamine product which may be generally characterized by the following formula:

$$B[-HNCNHCHCH-[OCH_2CH]-NH_2]_2$$
$$\quad\quad\overset{\|}{O}\quad\;\;\underset{R'}{|}\quad\quad\underset{R'}{|}\;{}_x$$

wherein R' independently represents hydrogen or methyl, x is a number having an average value of about 1 to about 60, and wherein B represents an alkyl group derived from alkyl diisocyanate, such as isophorone diisocyanate, m- and p-tetramethylxylylene diisocyanate and 1,6-hexamethylene diisocyanate etc. More particularly, B represents one of the following formulas:

[chemical structures of isophorone, tetramethylxylylene, and $(-CH_2-)_6$ groups]

A variety of molecular configurations are possible for the diamines of the present invention, depending on the starting materials.

Where isophorone diisocyanate (IPDI) and JEFFAMINE ®
D-230, D-400, D-2000 or D-4000 are used as reactants, the product can be represented by the structure:

[structure with isophorone core bearing two $-NHCNHCH(CH_3)CH_2[OCH_2CH(CH_3)]_x-NH_2$ chains]

where
x = 2 to 3 for JEFFAMINE ® D-230
x = 5 to 6 for JEFFAMINE ® D-400
x = ~33 for JEFFAMINE ® D-2000
x = ~60 for JEFFAMINE ® D-4000

The product resulting from the reaction of 1,6-hexamethylene diisocyanate and D-230, D-400, D-2000 or D-4000 can be represented by:

$$-[CH_2CH_2CH_2NH\overset{O}{\overset{\|}{C}}NHCH(CH_3)CH_2[OCH_2CH(CH_3)]_x-NH_2]_2$$

where
x = 2 to 3 for D-230
x = 5 to 6 for D-400
x = ~33 for D-2000
x = ~60 for D-4000

The product resulting from the reaction of tetramethylxylene diisocyanate (TMXDI) and JEFFAMINE ® D-400 can be represented by the following structure:

[structure of TMXDI reacted with two JEFFAMINE chains: $CH_3-C(CH_3)(CH_3)-NHCNHCH(CH_3)CH_2[OCH_2CH(CH_3)]_xNH_2$ on benzene ring with second $C(CH_3)_2-NHCNHCH(CH_3)CH_2[OCH_2CH(CH_3)]_xNH_2$]

where
x = 2 to 3 for D-230
x = 5 to 6 for D-400
x = ~33 for D-2000
x = ~60 for D-4000

In the embodiment of this invention wherein urea-linked diamines are formed, the use of t-butanol or i-propanol solvents retard the reaction rate of the polyoxyalkylene amines and diisocyante and made it possible to prepare urea-linked diamines.

In a variation of this embodiment novel polyoxyalkyleneamines can be used as the curing agent to make coatings, wherein the hardness of the coating may be varied by changing the diisocyanate used in the novel polyoxyalkyleneamines. The novel urea-linked polyoxyalkyleneamines are prepared by reacting polyoxyalkylenediamines with diisocyantes in the presence of an alcohol solvent according to the following equation:

[reaction scheme: IPDI + 2 $H_2NCH(CH_3)CH_2-[OCH_2CH(CH_3)]_x-NH_2$ in t-butanol gives urea-linked product]

The diisocyanates used included tetramethylxylene diisocyanate and hexamethylenediisocyanate.

Other polyoxyalkyleneamines which could be used included JEFFAMINE® D-230, D-400, D-2000 and D-4000.

This system exhibits the following improvements over the art;
1. Utilizes aliphatic isocyanates to introduce alkyl and urea funtionalities into polyoxyalkylene diamine.
2. No catalyst required.
3. Coating hardness can be varied by simply changing the diisocyanate and the nature of polyoxyalkylene diamine.
4. Improved compatibility of isocyanate coating systems.
5. Low reaction temperature
6. Colorless products.
7. Variety of liquid or solid products.

The present invention will be further illustrated by the following examples which are only for the purpose of illustration and are not to be regarded as limiting the invention in

COMPARATIVE EXAMPLE 1

This example demonstrates the reaction of a polyoxyalkylenediamine and a diisocyanate in the presence of water rather than alcohol.

To a pint wide-mouth jar equipped with a magnetic stirrer was added 300 ml of water and 20.7 g of JEFFAMINE ED-600 amine. This latter is a water-soluble polyether diamine with the structure:

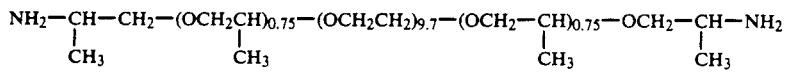

Isonate 143 is a modified methylene diphenyl diisocyanate sold by Dow Chemical. Thanol SF-5505 is a 5500 molecular weight polyoxypropylene triol sold by Texaco Chemical Co.

After adding the JEFFAMINE® ED-600, 21.6 g of an isocyanate prepolymer (e.w. of 315) prepared from Isonate 143-L and THANOL® SF-5505 polyol was added.

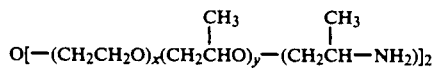

Where $x=4.35$ and $y=0.75$

The ratio of amine to polyol was 2:1. Polymer formed immediately and the white solid mass filled the jar. The product weighed 31 g. It darkened at 270° C. but still maintained its integrity at 300° C. The experiment above was repeated except that there was no stirring. The isocyanate prepolymer settled to the bottom with no reaction. When the mixture was stirred with a tongue depressor a white blob formed around the wooden stirrer. The weight of the polymer finally formed was 27 g with most of the amine remaining in the water. The same prepolymer was allowed to react with other di- and triamines in water. Amines included were ED-2001, white homogeneous dispersion; D-400, tough non-sticky ball; ED-900, white solid; D-230, white solid; T-403, slow reaction because isocyanate is coated with amine; ET-1000, ET-3000, T-5000 and no amine. In every case there was not enough solid polymer collected to account for the starting material. It appears much of the isocyanate was reacting with water instead of the amine.

EXAMPLE 2

Isophorone Diisocyanate (IPDI) and JEFFAMINE® D-400 in Isopropanol (at 1:2 molar ratio)

A 250 ml 3-necked flask equipped with a thermometer, mechanical stirrer, additional funnel and nitrogen inlet line was charged with JEFFAMINE® D-400 (80 g, 0.20 M). The mixture of IPDI (22.2 g, 0.10 M) and isopropanol (22.2 g) solvent was added dropwise through the additional funnel. An exothermic reaction was observed with the temperature rising to 42° C. (maximum temperature). The addition was over a 1.5 hour period of time while maintaining the temperature around 30° C. The product was clear and colorless. The IR analysis indicated urea formation. The amine titrations showed 1.53 meq/g (theoretical 1.60 meq/g).

EXAMPLE 3

Same except using EtOH instead of i-PrOH

The experiment above was repeated. The resulting product was a colorless, clear solution with IR analysis showing urea bonds and amine analysis showing 1.52 meq/g.

EXAMPLE 4

IPDI +JEFFAMINE® D-400 (1:2)

A mixture of JEFFAMINE® D-400 (160 g, 0.40 m) and i-PrOH (120) was charged into a flask. Isophorone diisocyanate (44.4 g, 0.20) was added dropwise at 20°-25° C. over a 1 hour period of time. The solvent in the product solution was removed by using a high vacuum. The resulting product was a colorless semisolid at room temperature. The analysis of amine indicated 1.59 meq/g.

EXAMPLE 5

IPDI+JEFFAMINE® D-400 (1:2)

The mixture of D-400 (160 g, 0.40), i-PrOH (80 g) and Cellosolve acetate (80 g) was placed in a flask. Isophorone diisocyanate, (44.4 g 0.20 M) was added dropwise into the amine mixture at 20°-25° C. in about 1 hour. After reaction, solvent was stripped under vacuum. The resulting viscous, colorless liquid (213 g) was analyzed to be 1.44 meq/g amine content.

EXAMPLE 6

The above experimental procedures were repeated except using methanol as the solvent (22.2 g). The mixture of IPDI (22.2 g, 0.10 M) and MeOH (22.2 g) was added to D-400 (80 g, 0.20 M) dropwise at 30° C. over a 2 hour period. The resulting clear, colorless solution was analyzed to have an amine content of 1.81 meq/g (theoretical 1.61 meq/g). Note: The higher content of amine in the sample indicated some reaction of methanol solvent with IPDI.

EXAMPLE 7 (Comparative)

Dimethyl carbonate solvent

Into a 250 ml 3-necked flask equipped with a thermometer, additional funnel, stirrer and nitrogen-inlet line was charged D-400 (80 g, 0.20 M). The mixture of IPDI (22.2 g 0.10 M) and dimethyl carbonate was dropped into the reactor over a 2 hour reaction period. Fast gel formation was observed. This example showed dimethyl carbonate is not a suitable solvent for the reaction.

EXAMPLE 8 (Comparative)

Methyl t-butyl ether solvent

The same experimental procedures were employed except using methyl t-butyl ether as solvent. The results indicated fast gel formation and that methyl t-butyl ether solvent is not suitable for this isocyanate-amine reaction.

EXAMPLE 9 (Comparative)

No solvent

The same experimental procedures were employed except using no solvent but IPDI (22.2 g, 0.10 M) and D-400 (80 g, 0.20 M). The reaction was uncontrollably fast.

EXAMPLE 10 t-butyl alcohol as solvent

Into a 500 ml 3-necked flask equipped with a thermometer, stirrer, additional funnel and nitrogen-inlet line, was charged D-400 (160 g, 0.40 M). The mixture of IPDI (44.4 g, 0.20 M) and t-butyl alcohol (88.8 g) was added dropwise over a 2 hour period of time. The reaction temperature was 26°-24° C. A clear colorless solution was obtained with amine analysis of 1.56 meq/g (calc. 1.37 meq/g).

EXAMPLE 11

IPDI+JEFFAMINE® D-4000

Into a 500 ml 3-necked flask equipped with a thermometer, stirrer, additional funnel and nitrogen-inlet line, was charged D-4000 (200 g, 0.05 M). A mixture of IPDI (5.6 g 0.025 M) in t-BuOH (11.1 g) was added dropwise at 24°-36° C. over one hour and the product allowed to stand overnight. A colorless viscous liquid was obtained. The IR analysis indicated the presence of a urea bond. The amine titration showed 0.15 meq/g. The viscosity was 12,681 cs/100° F.

EXAMPLE 12

IPDI+JEFFAMINE® D-2000 (1:2 molar ratio)

Into a 500 ml 3-necked flask equipped with a thermometer, additional funnel, stirrer and nitrogen-line, was charged D-2000 (200 g, 0.1 M). Then a mixture of isophorone diisocyanate (11.1 g, 0.05 M) in t-BuOH (22.2 g) was added dropwise over a 1.5 hour time period. The product, after standing overnight, was a viscous, colorless liquid. The analysis indicated the following: amine 0.39 meq/g, acidity 0.03 meq/g, isocyanate<0.001 meq/g.

EXAMPLE 13

IPDI+JEFFAMINE® D-230 (1:2)

Into a 250 ml 3-necked flask equipped with a thermometer, stirrer, additional funnel and nitrogen-line was charged D-230 (46 g, 0.2 M) and i-PrOH (46 g). Then the mixture of IPDI (22.2 g, 0.10 M) in i-PrOH (22.2 g) was added dropwise over one hour at 25°-30° C. pot temperature. The clear, viscous product solution had the following analysis: amine content 1.37 meq/g (calc. 1.47 meq/g).

EXAMPLE 14

IPDI+JEFFAMINE® D-230 (1:2)

The same experimental procedures were repeated. A mixture of IPDI (22.2 g, 0.10 M) in i-PrOH (11.2 g) was added into the solution of D-230 (46 g, 0.20 M) in i-PrOH (23 g) dropwise at 25°-30° C. over a 2 hour reaction time. Analysis of the product solution showed 1.93 meq/g for amine (calc. 1.95 meq/g).

EXAMPLE 15

IPDI+JEFFAMINE® D-230 (1:2)

The same experimental procedures were repeated. A mixture of IPDI (22.2 g, 0.10 M) in i-PrOH (11.2 g) was added into the solution of D-230 (46 g, 0.20 M) in i-PrOH (18 g) and water (5 g) over a 3 hour period at 20°-30° C. The resulting product solution was analyzed to be 1.88 meq/g for amine (calc. 1.95 meq/g).

EXAMPLE 16

1,6-hexamethylene diisocyanate+JEFFAMINE® D-400 (1:2 molar ratio)

A 500 ml 3-necked flask equipped with thermometer, stirrer, additional funnel and nitrogen-line, was charged with D-400 (150 g, 0.375 M), i-PrOH (75 g) and Cellosolve acetate (75g). The mixture was cooled to 5° C. by ice-water bath. Then 1,6-hexamethyl diisocyanate (28 g, 0.19 M) was dropped into the flask an hour with stirring. The portion of solvent was removed under vacuum to obtain a colorless, opaque solid which contained amine 1.28 meq/g (theoretical 1.3 meq/g).

EXAMPLE 17

TMXDI+JEFFAMINE® D-400 (1:2)

Using similar experimental procedures, tetramethylxylene diisocyanate (91.5 g) was dropped slowly into the mixture of D-400 (300 g), i-PrOH (150 g) and Cellosolve acetate (150 g) at 10°-20° C. pot temperature over a 2 hour period. A portion of the solvent was stripped off under vacuum to obtain 611 g product solution, containing amine 1.05 meq/g.

EXAMPLE 18

TMXDI+JEFFAMINE® D-400 (1:2)

A 500 ml 3-necked flask equipped with thermometer, stirrer, additional funnel, and nitrogen line, was charged with D-400 (120 g, 0.3 M) and i-PrOH (60 g). Tetramethylxylene diisocyanate (36.6 g, 0.15 M) was added dropwise over a 2 hour reaction time at 5°-22° C. The product solution was a colorless liquid, containing amine 1.22 meq/g (calc. 1.39 meq/g), (212 g).

EXAMPLE 19

Usage example (for expoxy applications)

A portion of product from Example 18 (54 g) was subjected to a vacuum desicator to remove isopropanol. At room temperature, the amine product was mixed well with Epon 828 (Shell, 28 g), and poured into a mold and cured at 80° C. overnight. A rubbery, light colored transparent material was made.

EXAMPLE 20

This example will illustrate the preparation of the blocked isocyanate used in this invention.

Into a 2-liter 3-necked flask equipped with a stirrer, thermometer, nitrogen source, dropping funnel, and water condenser were charged 800 g of a toluene diisocyanate adduct of trimethylolpropane dissolved in propylene glycol monomethyl ether acetate (Mondur CB-601 PMA; Mobay Chemical Co.). The isocyanate adduct had an isocyanate content of 10.5% (e.w. 400). Methyl ethyl ketone oxime (178 g) was then added dropwise over a 1-hour period. The reaction temperature peaked at 68° C. at the end of the methyl ethyl ketone oxime addition. The reaction mixture was then stirred 1.25 hours without additional heating. Ethylene glycol monoethyl ether acetate (108.7 g) was then used to dilute the blocked isocyanate. The infrared spectra of the product showed only a very small isocyanate band at 2480 cm$^{-1}$.

EXAMPLE 21

This example will illustrate the preparation of a heat cured coating using the JEFFAMINE ® D-400 isophorone diisocyanate of Example 5 as the curing agent for the blocked isocyanate of Example 20.

Into a one-half pint wide-mouthed bottle was charged 70.2 g of the blocked isocyanate of Example 20 and 99.4 g of the JEFFAMINE ® D-400 isophorone diisocyanate adduct of Example 5. The mixture was then thoroughly mixed using a wooden spatula. A portion of this mixture was then degassed on a rotary film evaporator.

Five mil films were prepared from the degassed mixture using a doctor blade. The films were then cured 1 hour at 100°–105° C. The cured films had a pencil hardness of H and a forward and reverse impact resistance of greater than 160 in/lb.

EXAMPLE 22

Using the general procedure of Example 20, blocked isocyanate coatings were prepared using the JEFFAMINE ® D-400 diisocyanate adducts of Examples 16 and 17 as the curing agent.

|  | Coating No. | |
| --- | --- | --- |
|  | Sample 1 | Sample 2 |
| Composition, pbw |  |  |
| Blocked isocyanate of Example 20 | 51 | 57.8 |
| JEFFAMINE ® D-400-tetramethylxylene diisocyanate of Example 17 | 99 | — |
| JEFFAMINE ® D-400-hexamethylene diisocyanate adduct of Ex. 16 | — | 92.2 |
| Film Properties |  |  |
| Film thickness, mil | 5 | 5 |
| Cure temperature, °C. | 100–105 | 100–105 |
| Cure time, hr. | 2 | 2 |
| Pencil hardness | B-HB | H-2H |
| Impact resistance, in/lb |  |  |
| Forward | Pass 160 | Pass 160 |
| Reverse | Pass 160 | Pass 160 |

EXAMPLE 23

THis example will show the improved storage stability of the blocked isocyanate compositions of this invention as compared to those which utilize conventional polyoxyalkyleneamines (JEFFAMINE ® D-400).

Compositions and storage stability data are shown in the following table:

|  | Sample No. | |
| --- | --- | --- |
|  | Sample 1 | Sample 2 |
| Composition, pbw |  |  |
| Blocked isocyanate of Ex. 21 | 51 | 106.5 |
| JEFFAMINE ® D-400-tetramethylxylene dduct of Example 17 | 99 | — |
| JEFFAMINE ® D-400 | — | 43.5 |
| Storage Stability |  |  |
| Viscosity, 77° F., cps (days) | 660(1) | 1700(1) |
|  | 1600(8) | 8500(8) |
|  | 2950(14) | 24250(14) |
|  | 9940(30) | 1448000(30) |

What is claimed is:

1. A flexible poly(urethane)(urea) coating prepared by reacting
   (a) a urea-linked polyoxyalkylene diamine having the following general structure:

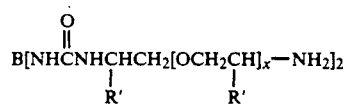

where B represents an alkyl nucleus structure from a diisocyanate from the group consisting of isophorone diisocyanate, 1-6-hexamethylene diisocyanate or tetramethylxylene diisocyanate, R' is hydrogen or methyl, and x is a number having an average value of about 1 to 60, with
   (b) a blocked isocyanate prepolymer prepared from a polyol from the group consisting of trimethylolpropane, toluene diisocyanate and methyl ethyl ketone oxime, in the presence of an organic solvent and at an elevated temperature,
   the improvement comprising improved storage stability and compatibility of component (a) and (b).

2. A polyurethane-urea coating as in claim 1 where in R' is methyl and x has a value of 5 to 6.

* * * * *